July 7, 1931. F. W. C. NEUNER 1,813,755
HEADLAMP LOCATING AND CLAMPING BAND CONSTRUCTION
Filed May 10, 1930
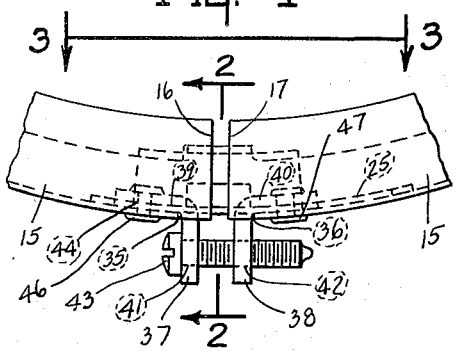
INVENTOR.
FREDERICK W. C. NEUNER.
BY Lockwood Lockwood
Goldsmith & Galt
ATTORNEYS.

Patented July 7, 1931

1,813,755

UNITED STATES PATENT OFFICE

FREDERICK W. C. NEUNER, OF CONNERSVILLE, INDIANA, ASSIGNOR TO INDIANA LAMP CORPORATION, OF CONNERSVILLE, INDIANA, A CORPORATION

HEADLAMP LOCATING AND CLAMPING BAND CONSTRUCTION

Application filed May 10, 1930. Serial No. 451,272.

This invention relates to a split rim construction for lamps of the headlamp type and is of the clamping and mounting type.

The chief object of this invention is to provide a split rim or band which, when sufficiently contracted, clampingly mounts a closure upon a lamp body for completing the lamp. The rim is associated with suitable means whereby the several parts are held in predetermined position relative to the lamp body. The rim, closure, and associated parts are arranged so that substantially complete peripheral closure is obtained with the band.

The chief feature of the invention consists in mounting upon the two adjacent ends of a split rim or band similar or identical members and associating therewith a combination utilitarian plate whereby the several parts are mounted in predetermined relation and the split in the band is covered.

Other objects and features of the invention will be understood from the accompanying drawings and the following description and claims:

In the drawings, Fig. 1 is a front view of a portion of a headlamp construction embodying the invention, parts thereof being shown dotted. Fig. 2 is a transverse sectional view taken on the line 2—2 of Fig. 1 and in the direction of the arrows. Fig. 3 is a top plan view of the invention taken on the line 3—3 of Fig. 1 and in the direction of the arrows. Fig. 4 is a perspective view of one embodiment of the combination utilitarian plate. Fig. 5 is a view similar to Fig. 1 and of a modified form of the invention. Fig. 6 is a transverse sectional view taken on the lines 6—6 of Fig. 5 and in the direction of the arrows. Fig. 7 is a top plan view and is taken on the line 7—7 of Fig. 5 and in the direction of the arrows. Fig. 8 is a perspective view of the modified form of the invention illustrated in Figs. 5 to 7 inclusive. Fig. 9 is a plan view of a portion of the lamp body with the locating slot included.

In the drawings 10 indicates a lamp body or casing, 11 a reflector having a peripheral flange 12 forming the seat for a gasket 13 which bears upon the rear peripheral edge of a lens closure 14. A rim in the form of a split band 15 includes two adjacent ends 16 and 17 and the inner peripheral edge portion 18 of the band bears upon the closure. The lamp body 10 has a peripheral groove 19 which nests the curled and peripheral rear edge 20 of the split band or rim. The casing 10 is provided with a forwardly-directed flange 21 which terminates in an inwardly-directed flange 22 which is slotted as at 23 to receive an interlocking tongue 24 struck from the gasket-forming flange 12 upon the reflector 11, see Fig. 2. A plate 25 includes a curved portion 26 that conforms to the curvature of the band in radial cross section and said curved extension 26 terminates in the locking tongue 27 which extends into a gap or notch 28 formed in the lamp closure and definitely locates the lens closure relative to the band parting.

The plate 25 includes a locating or locking tongue 29 which is receivable by the slot 30 of the flange 21 of the lamp body so that the reflector 11, which is at a predetermined location relative to the lamp body, through the interlocking portions 23 and 24 and the cooperating plate 25, has a predetermined position relative thereto and the body through the lug 29 and slot 30 so that the lens 14 has predetermined positioning relative to all of the aforesaid through the tongue 27 and slot 28 formed in the lens closure.

So much for the interlocking and locating features of the combination utilitarian plate. Plate 25 includes an elongated slot 31, the opposite ends of which are indicated by the numerals 32 and 33. Adjacent the end 32 there is illustrated a pair of ears or stops 34 which extend upwardly in parallel relation and are separated by the slot spacing.

The end 16 of the band is notched as at 35 and the end 17 is notched as at 36 and nested in each is a similar or identical, if desired, angle member having the depending portions 37 and 38 respectively and the angling portions 39 and 40 respectively. The two depending portions 37 and 38 extend outwardly from the construction in substantially parallel relation and herein member 37 is shown apertured as at 41 and the member 38 is shown apertured and threaded as at 42. The bolt 43 is herein shown rotatably mounted in opening 41 of ear 37 and threadedly mounted in threaded opening 42 of ear 38. When the bolt 43 is rotated clockwise, the two ears approach each other and position the band in clamping and seating relation in the groove 19 of the body.

The portion 39 of the angling member is apertured as at 44 and said angling member overlies the plate 25 and the free ends thereof extend laterally in opposite directions as at 45. The lateral enlargements 45 engage the abutments 34 and thus relative movement toward the end 33 of the slot 31 is prevented. The rivet construction 46 rigidly connects the angling member 37–39 and the plate 25 to one end of the rim or band and herein the one terminating at 16.

The other angling member has its portion 40 provided with ears or lateral enlargements 45 which slide upon the face of the plate 25 adjacent the longitudinal edges of the slot 31. The rivet construction 47 anchors the angling member to the other end of the band represented by that portion terminating at 17. Slot 31 and rivet 47 constitute a pin and slot connection. Clockwise rotation of the bolt 43 causes the two angling members to approach each other which causes the two ends of the split band to be positioned immediately adjacent each other. Counter-clockwise rotation of the bolt 43 permits relative sliding movement between the plate 25, and the angling member 38—40 and this continues until the threaded bolt is entirely separated from the threaded opening 42 and the ends of the band or rim are spaced at a relatively wide distance apart. To prevent complete separation and misalignment, the portion 33 of the band 35 limits the separating movement of the two ends of the band and also holds the band in substantially plane alignment.

It will be apparent, therefore, that in this form of the invention, in addition to the cooperating locking and locating features before set forth, the invention further has the advantage that the space between the two ends of the band, when mounted upon the body, is fully covered by the plate and its supported portions except for the space portion between the two depending ears 37 and 38 and of a width equal to and in registration with the slot 31. A part of this space, of course, as shown clearly in Fig. 3, is occupied by the clamping bolt 43.

Figs. 5 to 9 inclusive illustrate a modified form of the invention in which the same parts bear like numerals but of the one hundred series. In this form of the invention the departures are as follows: The locking tongue 127 is not formed as an extension on the curved portion 126 but is formed by notching a part of the plate adjacent the slot therein.

Likewise, in this form of the invention, the slot 130 in the body flange 121 is not peripherally arranged but is radially-arranged with reference to the axis of the body, see Fig. 9. To cooperate therewith, the rim-locating tongue 129 is arranged at right angles to the rim-locating tongue or lug 29 of the first-mentioned form of the invention. With these exceptions, the modification shown in Figs. 5 to 9 inclusive function substantially identical to that shown in Figs. 1 to 4 inclusive.

This application is a continuation in part of my copending application, Ser. No. 416,511, filed December 26, 1929.

The invention claimed is:

1. A lamp structure including a casing open at one end, a lens closure for said opening, a split door rim surrounding the periphery of said lens and adapted to clamp the same in closing relation to said opening, a lug attached to each end of said rim adjacent the split, one of said lugs having a portion projecting within said rim, means for drawing said lugs together, and a member adapted to engage the internally projecting lug and fastened to the other end of said rim for limiting the movement of the said ends when in non-clamping position.

2. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, and a pin and elongated slot connection between said projecting end of the plate and the ear mounted up said other band end for securing predetermined alignment of the band ends when drawn towards each other.

3. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, a pin and elongated slot connection between said projecting end of the plate and the ear mounted upon said other band end for securing predetermined alignment of the band ends when drawn towards each other, the plate having a portion cooperating with the pin for preventing complete separation of the band ends when the ears are not connected by the bolt.

4. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, a pin and elongated slot connection between said projecting end of the plate and the ear mounted upon said other band end for securing predetermined alignment of the band ends when drawn towards each other, and a single means for simultaneously and immovably anchoring to the band end said plate and ear carried by said band end.

5. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, a pin and elongated slot connection between said projecting end of the plate and the ear mounted upon said other band end for securing predetermined alignment of the band ends when drawn towards each other, and cooperating means upon the plate adjacent its immovable anchorage to the band end and upon the ear supported thereby for securing predetermined locating positioning therebetween.

6. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, a pin and elongated slot connection between said projecting end of the plate and the ear mounted upon said other band end for securing predetermined alignment of the band ends when drawn towards each other, a cooperating locating connection between the plate and the band end to which it is immovably secured, and cooperating means upon the plate adjacent its immovable anchorage to the band end and upon the ear supported thereby for securing predetermined locating positioning between the band end, plate and cooperating ear.

7. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, a pin and elongated slot connection between said projecting end of the plate and the ear mounted upon said other band end for securing predetermined alignment of the band ends when drawn towards each other, the plate having a portion cooperating with the pin for preventing complete separation of the band ends when the ears are not connected by the bolt, and a single means for simultaneously and immovably anchoring to the band end said plate and ear carried by said band end.

8. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, a pin and elongated slot connection between said projecting end of the plate and the ear mounted upon said other band end for securing predetermined alignment of the band ends when drawn towards each other, and cooperating means upon the plate adjacent its immovable anchorage to the band end and upon the ear supported thereby for securing predetermined locating positioning therebetween, the plate having a portion cooperating with the pin for preventing complete separation of the band ends when the ears are not connected by the bolt.

9. A rim construction for mounting upon a lamp casing and including a split band, a bolt receiving ear extending outwardly from the band adjacent each end thereof, a clamping bolt for drawing the ears together and with them the band ends, a cooperating plate immovably associated with one band end and projecting towards the other band end and bridging the rim split, a pin and elongated slot connection between said projecting end of the plate and the ear mounted upon said other band end for securing predetermined alignment of the band ends when drawn towards each other, a cooperating locating connection between the plate and the band end to which it is immovably secured, and cooperating means upon the plate adjacent its immovable anchorage to the band end and upon the ear supported thereby for securing predetermined locating positioning between the band end, plate and cooperating ear, the plate having a portion cooperating with the pin for preventing complete separation of the band ends when the ears are not connected by the bolt.

In witness whereof, I have hereunto affixed my signature.

FREDERICK W. C. NEUNER.